United States Patent [19]

Tieleman et al.

[11] Patent Number: 4,610,050
[45] Date of Patent: Sep. 9, 1986

[54] DEVICE FOR DRAWING THE CROP AND GULLET FROM SLAUGHTERED POULTRY

[75] Inventors: Rudolf J. Tieleman, Doesburg; Ritsaert L. J. M. Ruesen, Doetinchem, both of Netherlands

[73] Assignee: Linco Holland Engineering B.V., Doesburg, Netherlands

[21] Appl. No.: 742,176

[22] Filed: Jun. 7, 1985

[30] Foreign Application Priority Data

Oct. 22, 1984 [EP] European Pat. Off. ........ 84201518.2

[51] Int. Cl.$^4$ ............................................. A22C 21/06
[52] U.S. Cl. ........................................................ 17/11
[58] Field of Search ....................................... 17/11, 45

[56] References Cited

U.S. PATENT DOCUMENTS

| | | | |
|---|---|---|---|
| 2,512,290 | 6/1950 | Spang | 17/11 |
| 2,533,445 | 12/1950 | Finney | 17/11 |
| 3,751,761 | 8/1973 | Weiland | 17/11 |
| 4,208,764 | 6/1980 | Loth et al. | 17/11 |
| 4,467,498 | 8/1984 | Graham et al. | 17/11 |

Primary Examiner—Willie G. Abercrombie
Attorney, Agent, or Firm—Beveridge, DeGrandi and Weilacher

[57] ABSTRACT

The invention relates to a device for drawing the crop and gullet from slaughtered poultry, provided with a bore tube, having loosening and entrailing means at its free end, and which is introduced into the bird's trunk via an opening between the breast-bone and the tail of the bird. According to the invention two diametrically opposed strips (42, 43) are secured at the free end of the bore tube (14) and extend parallely to the center line of the tube, said strips along two diagonally opposed edges being provided with teeth (44) which are directed obliquely inwardly and toward the free end of the strip (42, 43).

11 Claims, 8 Drawing Figures

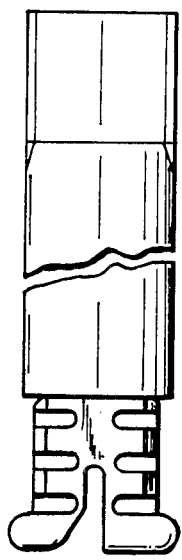
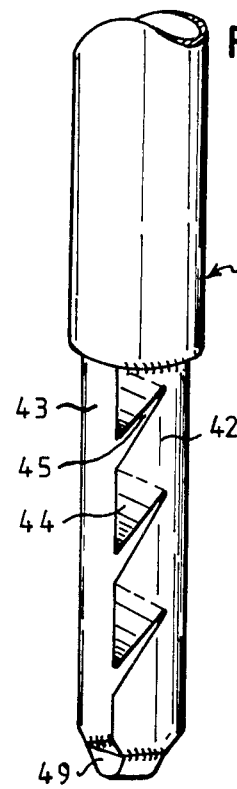
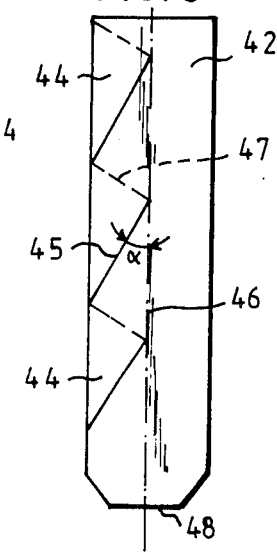
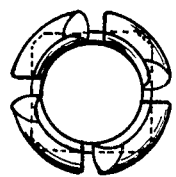
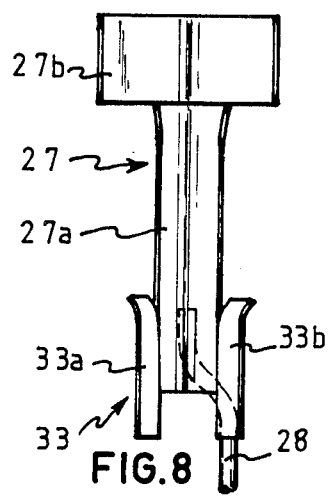
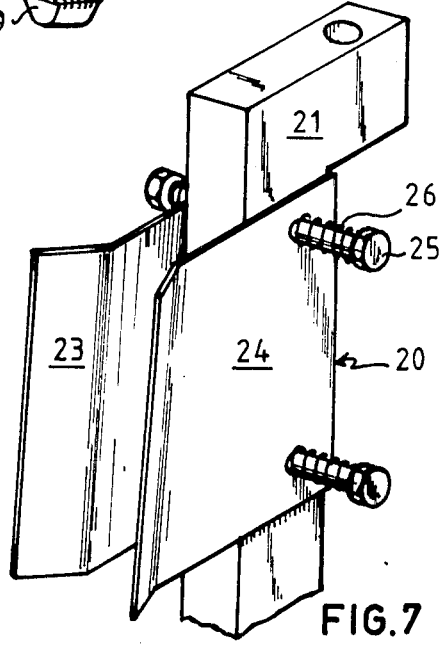

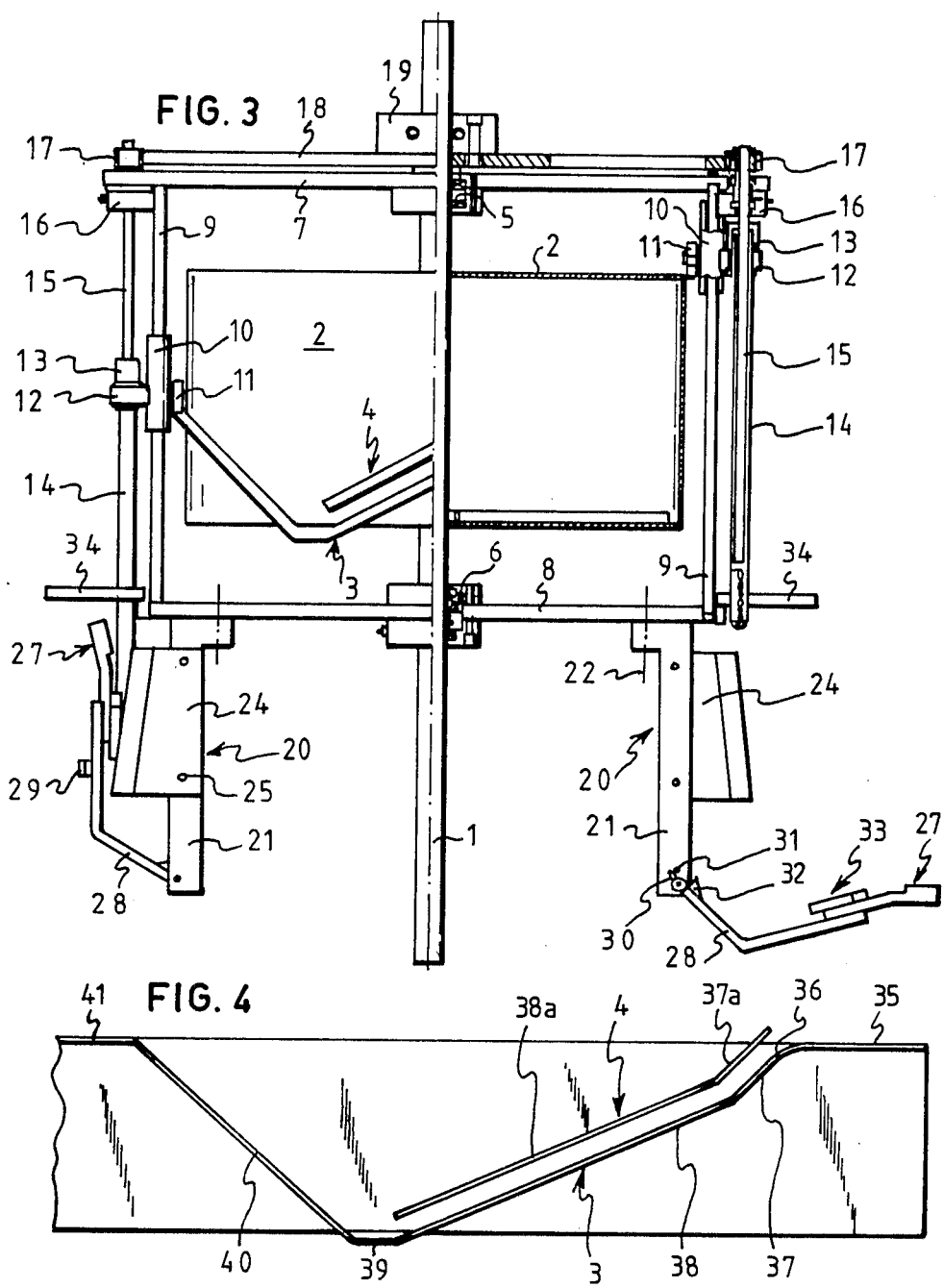

1

DEVICE FOR DRAWING THE CROP AND GULLET FROM SLAUGHTERED POULTRY

BACKGROUND OF THE INVENTION

The invention relates to a device for drawing the crop, vent and gullet from slaughtered poultry, provided with a bore tube, having loosening and entrailing means at its free end, and which is introduced into the bird's trunk via an opening between the breastbone and the tail of the bird.

A device of this type is known from applicant's own practice, vide FIGS. 1 and 2 of the drawing, wherein FIG. 1 shows a side view and FIG. 2 a bottom view of the known bore tube, and at its lower end the bore tube is provided with a square hollow end section, the corners of which are flattened, and having a cylindrical bore in the extension of that of said tube. The lower end of the square end section is provided with a round protruding collar. Furthermore a saw cut is made in the center of each flat face of the square, longitudinally of the tube, over a part of the length of the square end section, one edge of said saw cut being bevelled at an angle of approximately 30° with the center line of the tube. Thereby a kind of teeth are formed, and the partly bevelled and partly straight edge of the saw cuts must loosen and entrail the crop, the gullet and possible the stomach for which purpose the bore tube should be rotated about its longitudinal axis. Said known bore tube can, however, not very well engage the crop and the like in the bird's neck, so that often many attempts have to be made before the crop, the gullet and the stomach and possibly other parts of the body have been removed from the bird's neck.

SUMMARY OF THE INVENTION

The invention tends to abolish the drawbacks of the known device.

This object is achieved in that according to the invention two diametrically opposed strips are secured at the free end of the bore tube and extend parallelly to the center of the tube, said strips along two diagonally opposed edges being provided with teeth which are directed obliquely inwardly and toward the free end of the strip.

Now the teeth at the diagonally opposed edges of the strips on the bore tube easily catch the crop and the gullet and the like, and retain same by the narrowing part of the slit between the edges of the strips and the teeth, so that the crop, the vent and possibly the stomach are effectively and quickly caught and loosened upon the rotation of the bore tube about its longitudinal axis. Because the bore tube is introduced between the throat and the scruff in the bird's neck, the scruff of the neck is stretched. Because in the bore tube according to the present invention the slit between the strips extends over the entire length thereof, the scruff of the neck can easily and quickly force the crop and the gullet into said slit.

According to the method and with the bore tube known up to now for drawing the crop and the like from slaughtered poultry, the crop, the gullet and the stomach of the slaughtered poultry are drawn therefrom, in that the bore tube is introduced by hand into the abdomen and the neck of the bird, and then it is rotated about its longitudinal axis by hand. Said known method is cumbrous and lengthy.

According to the invention the device is characterized in that the bore tube is mounted, while being rotatable about its longitudinal center line, on a carriage that is movable in a vertically upward and downward movement, said carriage being adapted to be displaced in a horizontal plane and being adapted to be controlled vertically by a fixed curve track, and that the bore tube is longitudinally displaceably coupled to a drive rod that can be driven by a pinion, co-operating with a toothed element that is fixedly arranged parallely to the horizontal direction of displacement of the carriage.

By using a device that is embodied in this way, the drawing of parts from slaughtered poultry can be strongly mechanized and thereby it can be accelerated considerably with respect to the manual operation.

BRIEF DESCRIPTION OF THE DRAWINGS

The invention will be further described with reference to the drawings, which show some embodiments.

FIGS. 1 and 2 are side and bottom views of a known bore tube.

FIG. 3 is a partial side view and a partial vertical cross-section of an embodiment of the device according to the invention for drawing parts from slaughtered poultry.

FIG. 4 shows the projection in a flat plane of the curve track for controlling the vertical movement of the bore tube.

FIG. 5 is a partial view in perspective of the bore tube according to the invention.

FIG. 6 is a side view of the strips which are mounted at the end of the bore tube.

FIG. 7 is a perspective view as seen in the direction of arrow VII in FIG. 3 of the stretching mechanism for the bird.

FIG. 8 is a perspective view as seen in the direction of arrow VIII in FIG. 3 of a pressure plate for the bird.

DETAILED DESCRIPTION

The device for drawing parts from slaughtered poultry, illustrated in FIG. 3, is provided with a vertical stationary column 1, on which a drum 2 is mounted, which is provided along a part of its periphery with a curve track 3, 4, the shape and function of which will be further elucidated hereinafter.

Furthermore a top plate 7 and a lower plate 8 respectively are mounted on the column 1 by means of bearings 5, 6, said plates being interconnected by means of several pairs of vertical guide rods 9. On each pair of guide rods 9 a carriage 10 is vertically slidable, said carriage 10 being provided with a follower roll 11, co-operating with the curve-track 3, 5. At the outside the carriage 10 carries a bearing 12, in which a hub 13 is mounted while being rotatable about a vertical center line, and in the underside thereof the bore tube 14 is screwed.

The hub 13 is coupled to a square 15 by means of a square bore, said shaft being supported in a bearing 16 on the top plate 7, and above the plate 7 it is provided with a pinion 17 that engages a large gear wheel 18 that is fixedly secured on the column 1 by means of a hub 19.

The assembly of the top plate 7, the lower plate 8 and the guide rods 9 is rotated about the center line of the column 1 during operation of the device, in that said assembly is coupled with a conveyor above the turret-like device according to FIG. 3, and the slaughtered birds are suspended by their legs on hooks, secured to the conveyor.

At the underside of the lower plate 8, at the location of each pair of guide rods 9, a stretching mechanism 20 for a bird is secured. The stretching mechanism 20 is provided with a squared bracket 21, that is secured to the lower plate 8 by means of bolts 22, and wherein the brackets 21 can be interconnected at their underside by means of a ring (not illustrated), consisting of one or more parts, so as to secure the brackets rigidly in radial and in peripheral direction. On both sides of the bracket 21 a pair of vertically upright plates 23, 24 are mounted, the front free edge thereof being bent outwardly at an angle, and which are mounted on guide bolts 25 such that they can slide toward and away from each other, compression springs 26 being mounted on the bolts 25 between the heads thereof and the plates 23, 24.

The stretching mechanism 20 is furthermore provided with a pressure plate 27 that is secured on an arm 28, which is mounted pivotally at the lower end of the bracket 21. The pressure plate 27 consists of an elongated, V-shaped bent plate 27a, onto which, at its free end and in the extension thereof, a wider V-shaped plate 27b is welded. The plate 27a presses on the narrow front section of the bird's back, whilst the wider plate 27b presses on the wider rear section of the bird's back. The pressure plate 27 with the arm 28 can be brought from the inoperative position at the right-hand side of FIG. 3 into the operative position according to the left-hand side of FIG. 3 by means of a fixed guide 29 on the frame of the device (not illustrated), onto which the column 1 is mounted as well. The arm 28 is provided with protrusions 30 and 32, co-operating with a fixed stop 31 and defining the extreme positions of the pressure plate 27.

According to the invention a V-shaped guide 33 is secured on the pressure plate 27, vide FIG. 3 at the lower right-hand side, and FIG. 8, said guide being situated at the level of the bird's neck when it is in the pressing position (FIG. 3 at the left-hand side), making sure that the neck will be positioned straight under the bird's trunk.

The V-shaped guide 33 consists of two strips 33a and 33b, which are welded at the free end laterally of the outer edge of the plate 27a. The strips 33a and 33b enclose a somewhat more acute angle than the V-shaped bent plate 27a. The end sections of the strips 33a and 33b which are closest to the V-shaped plate 27b, are not welded to the plate 27a and they are bent outwardly of the plane of the strips 33a and 33b at an angle of ±30°. The strips 33a and 33b guide the bird's neck when the pressure plate 27 approaches the bird, and they prevent the neck from extending laterally outwardly. Together with the V-shaped plate 27 the strips 33a and 33b make sure that the bird's neck is straight and is positioned in the extension of the bird's trunk.

At the location of each pair of guide rods 9 a spreader plate 34 is secured on the lower plate 8, the outer end of said spreader plate leading its inner end in the direction of rotation of the assembly 7, 8, 9. Thereby the spreader plate 34 can easily engage between the legs of the birds which are suspended on hooks and which are fed tangentially to the device according to the invention by means of the above-mentioned conveyor.

FIG. 4 shows the projection of the curve-track 3, 4 on the drum 2 in a flat plane. The direction of rotation of the assembly 7, 8, 9 is indicated by the arrow A. The curve track section 3 has an entering section 35 that changes, by means of a curve 36, into a relatively steep section 37 at an angle of ±48°, so that the bore tube 14 sinks relatively quickly into the bird's trunk. When the beginning of the curve 36 is assumed to have a starting point of 0° rotation of the assembly 7, 8, 9, the assembly 7, 8, 9 has rotated over an angle of ±25° at the end of the relatively steep section 37. The steep section 37 changes into a less steep section 38 at an angle of ±22°, so that the bore tube sinks relatively slowly downwardly through the bird's neck and engages and loosens the crop, the gullet and the like, and during the last part of the section 38 the bore tube 14 moves downwardly out of the bird's neck. The assembly 7, 8, 9 rotates over a peripheral angle of ±115° during the movement of the roll 11 in the curve track section 38. When it moves over the curve track sections 37 and 38 the roll 11 is vertically enclosed with some tolerance by the curve track sections 37a and 38a of the curve track 4 which are parallel to the sections 37 and 38 respectively.

A horizontal section 39 adjoins the section 38 of the curve track 3, and the bore tube 14 with the parts of the bird contained therein is displaced parallely to itself in horizontal direction, and during said movement the bore tube is cleaned with the aid of a rotary brush and water. A desinfectant may be added to the water. The horizontal section 39 of the curve track 3 covers an angle of ±115°.

A relatively steep section 40, extending upwardly at an angle of ±45°, adjoins the curve track section 39, wherein the assembly rotates over an angle of ±75°, and during said rotation the bore tube 14 is drawn upwardly from the bird. After the section 40 the roll 11 of the carriage 10 moves on a horizontal section 41 that extends up to and including the entering section 35, i.e. up to the beginning of the curve 36. During said free rotation of the assembly 7, 8, 9, the processed birds can be taken off the hooks and unprocessed birds can be suspended by the legs on the hooks after which the above describe cycle can start again.

The speed of rotation of the assembly 7, 8, 9 is such that the bore tube 14 rotates with a number of revolutions of ±one revolution/15 centimeters of covered track of the conveyor on which the birds are suspended, the travelling speed of the conveyor being approximately equal to the peripheral speed of the assembly 7, 8, 9, thus equal to that of the pinion 17 around the large gear wheel 18 on the column 1.

The guide 29 extends over a part of the periphery of the curve track 3 and at its beginning it is provided with a rising section, and at the end it is provided with a falling section, having such a configuration that the movement of the arm 28 and that of the pressure plate 27 takes place gradually. The section of the guide 29 with which it forces the pressure plate 27 against the bird's back may be replaced and/or completed by an elastic endless tape or belt, running over two discs and extending in the peripheral direction (not illustrated).

As has been indicated in the description of FIG. 3 the top end of the bore tube 14 is screwed into the hub 13. According to the invention two diametrically opposed strips 42, 43, extending parallely to the center line of the tube, are secured to the lower end of the bore tube 15, and along two diagonally opposed edges said strips are provided with teeth 44 that extend obliquely inwardly and toward the free end of the strips 42, 43. The teeth 44 are preferably made out of the material of the strips 42, 43, but they might also be secured to the strips as loose parts, for instance by soldering.

For each tooth 44 a saw cut 45 is made in the longitudinal edge of the strips 42, 43, said cut enclosing an acute angle $\alpha$ of preferably ±30° with the longitudinal center line 46 of the strips 42, 43. The thus formed tooth is bent inwardly about a bending line 47 that extends perpendicularly to the saw cut 45.

The strips 42, 43 are arched transversely to their longitudinal center line 46, under such a bending radius that the strips 42, 43 form parts of a cylinder that is concentric relative to the actual bore tube 14.

At their free ends the corners of the strips 42, 43 are cut off at an angle of 30° with the longitudinal center line 46 and the thus formed narrower ends 48 of the strips 42, 43 are interconnected by the central part of a spherically shaped guide element 49. Said configuration of the free end of the bore tube tends to facilitate the movement of the bore tube into the slaughtered bird and to make sure that the interior of the bird is damaged as little as possible.

The operation of the device according to the invention is as follows:

During the movement of the roll 11 over the horizontal curve track section 41 the processed birds are taken off the hooks and unprocessed birds are suspended by the legs on the hooks, after which the arm 28 arrives on the rising section of the guide 29, the arm 28 with the pressure plate 27 are moved upwardly and the pressure plate 27 presses on the bird's back. The V-shaped guide 33 keeps the neck straight under the bird's trunk.

Upon the movement of the roll 11 over the curve track sections 36, 37 and 38 the bore tube 14 moves downwardly, while it is rotating, into the trunk and then into the neck of the bird, and it removes the crop, the gullet and possibly the stomach from the bird, and it protrudes downwardly out of the neck of the bird.

During the movement of the roll 11 on the section 39 of the curve track 3 the bore tube 14 is cleaned in the above indicated way and upon the movement of the roll 11 on the section 40 of the curve track the bore tube 14 is pulled upwardly out of the bird.

When the roll 11 rolls on the section 41 of the curve track 3, the arm 28 arrives on the falling section of the fixed guide 29 and the arm 28, with the pressure plate 27 and the V-shaped guide 33, moves outwardly away from the bird into the position according to FIG. 3 at the right-hand side. The processed birds can be taken off the hooks now, and unprocessed birds can be suspended in the hooks, after which the cycle starts all over again.

The above described device according to the invention may also form a part of a series of processing devices, placed one behind the other, for slaughtered birds, wherein the birds are suspended on the hooks of the conveyor at the beginning of the series of processing devices, and at the end of the series of processing devices they can be taken off the hooks again. So then the processed birds need not be taken off the hooks during the movement of the roll 11 of the present device over the curve track section 41, and no unprocessed birds need be suspended on the hooks again.

We claim:

1. A device for drawing the crop and gullet from slaughtered poultry, provided with a bore tube, having loosening and entrailing means at its free end, and which is introduced into the bird's truck via an opening between the breast-bone and the tail of the bird, characterized in that two diametrically opposed strips each have one end which is secured at the free end of the bore tube (14), said strips extending parallely to the center line of the tube, said strips along two opposed edges being provided with teeth (44) which are directed obliquely and toward the other end of the strip (42, 43).

2. A device according to claim 1, characterized in that the teeth (44) are formed out of the material of the strips (42, 43).

3. A device according to claim 1, characterized in that for each tooth (44) a slit is formed in the longitudinal edge of the strips (42, 43), enclosing an acute angle (α) with the longitudinal center line (46) of the strip (42, 43).

4. A device according to claim 3, characterized in that the slit is formed between the longitudinal edge and the longitudinal center line (46) of the strip, and that it encloses an angle (α) of about 30° with said center line (46).

5. A device according to claim 1, characterized in that the strips (42, 43) are arched transversely to their longitudinal center line (46) and that the corners of the strips (42, 43) at their free ends are cut off at an angle of 30° with respect to the longitudinal center line (46), said other end of the strips being interconnected by a central section of a spherically shaped guide element (49).

6. A device according to claim 1, characterized in that the bore tube (14) is mounted, while being rotatable about its longitudinal center line, on a carriage (10) that is movable in a vertically upward and downward movement, said carriage being adapted to be displaced in a horizontal plane and being adapted to be controlled vertically by a fixed curve track (3, 4), and that the bore tube is longitudinally displaceably coupled to a drive rod (15) that can be driven by a pinion (17), co-operating with a toothed element (18) that is fixedly arranged parallely to the horizontal direction of displacement of the carriage (10).

7. A device according to claim 6, in which the bird is suspended by its legs on hooks and being supported by a stretching mechanism, said hooks and stretching mechanism being displaceable in a horizontal plane synchronously with the carriage, characterized in that the stretching mechanism (20) has two vertically upright plates (23, 24), bent outwardly at their free edge, said plates being adapted to be slid toward and away from each other on guide bolts (25), wherein compression springs (26) are mounted between the heads of the bolts and the plates.

8. A device according to claim 7, wherein the stretching mechanism is provided with a pivotally mounted pressure plate that can be controlled by a fixed guide, characterized in that a V-shaped guide (33) is secured on the pressure plate (27), said guide being at the level of the bird's neck when it is in its pressing position.

9. Apparatus for drawing the crop and gullet from a slaughtered bird, comprising, a device which is introduced into the bird's trunk via an opening between the breast bone and the tail of the bird, said device having an exposed edge which extends lengthwise along the device, said device having a plurality of slits which each have an open end and a closed end, said open ends of the slits being located at the exposed edge of the device, a plurality of teeth formed between said slits, each of said teeth having a pointed end, means for moving the device to move the teeth forwardly in the direction of their pointed ends to catch the crop or gullet and move it into a slit toward said closed end thereof, said moving means also moving the device forwardly with respect to the bird to carry the crop and gullet out of the bird's neck.

10. Apparatus according to claim 9 wherein the slit is disposed at an acute angle with respect to the longitudinal axis of the device.

11. Apparatus according to claim 9 wherein each slit is wider at its open end than at its closed end.

* * * * *